(12) United States Patent
Stumpf

(10) Patent No.: US 7,328,215 B2
(45) Date of Patent: Feb. 5, 2008

(54) HYBRID AND DYNAMIC REPRESENTATION OF DATA STRUCTURES

(75) Inventor: Dirk Stumpf, Bruchsal (DE)

(73) Assignee: SAP AG, Walldorf (DE)

( * ) Notice: Subject to any disclaimer, the term of this patent is extended or adjusted under 35 U.S.C. 154(b) by 297 days.

(21) Appl. No.: 10/137,211

(22) Filed: Apr. 30, 2002

(65) Prior Publication Data

US 2003/0172078 A1    Sep. 11, 2003

Related U.S. Application Data

(60) Provisional application No. 60/361,144, filed on Mar. 1, 2002.

(51) Int. Cl.
*G06F 17/30* (2006.01)

(52) U.S. Cl. ............. 707/100; 707/102; 707/205; 707/206

(58) Field of Classification Search .......... 707/3, 707/100, 102, 6, 103, 104.1; 345/853–855
See application file for complete search history.

(56) References Cited

U.S. PATENT DOCUMENTS

| 5,727,175 A * | 3/1998 | Malone et al. ............. 345/763 |
| 5,802,526 A * | 9/1998 | Fawcett et al. ........... 707/104.1 |
| 6,167,396 A * | 12/2000 | Lokken .................... 707/3 |
| 6,237,006 B1 | 5/2001 | Weinberg et al. |
| 6,311,187 B1 * | 10/2001 | Jeyaraman .................. 707/10 |
| 6,348,935 B1 * | 2/2002 | Malacinski et al. ......... 345/853 |
| 6,499,026 B1 * | 12/2002 | Rivette et al. ................ 707/2 |
| 6,615,207 B1 * | 9/2003 | Lawrence ................... 707/5 |
| 6,701,362 B1 * | 3/2004 | Subramonian et al. ...... 709/224 |
| 6,763,496 B1 * | 7/2004 | Hennings et al. ......... 715/501.1 |
| 6,775,675 B1 * | 8/2004 | Nwabueze et al. ......... 707/100 |
| 2003/0055812 A1 * | 3/2003 | Williams et al. ............. 707/1 |

FOREIGN PATENT DOCUMENTS

| EP | 0694829 A1 | 1/1996 |
| WO | WO 01/063480 A3 | 8/2001 |

OTHER PUBLICATIONS

International Search Report, International Application No. PCT/IB03/01258, Dec. 18, 2003, pp. 1-2.

* cited by examiner

*Primary Examiner*—Cam Y T Truong
(74) *Attorney, Agent, or Firm*—Schwegman, Lundberg & Woessner, P.A.

(57) ABSTRACT

Methods and apparatus for dynamic and hybrid representation of data structures. A computer program product for representing a data structure includes instructions to cause a processor to receive information associated with the data structure, and determine how to represent the data structure as one of a tree representation, a breadcrumb representation, and a hybrid of a tree representation and a breadcrumb representation. The product is tangibly stored on machine-readable media. A method for representing a data structure includes representing the data structure as a hybrid of a tree representation and a breadcrumb representation.

32 Claims, 5 Drawing Sheets

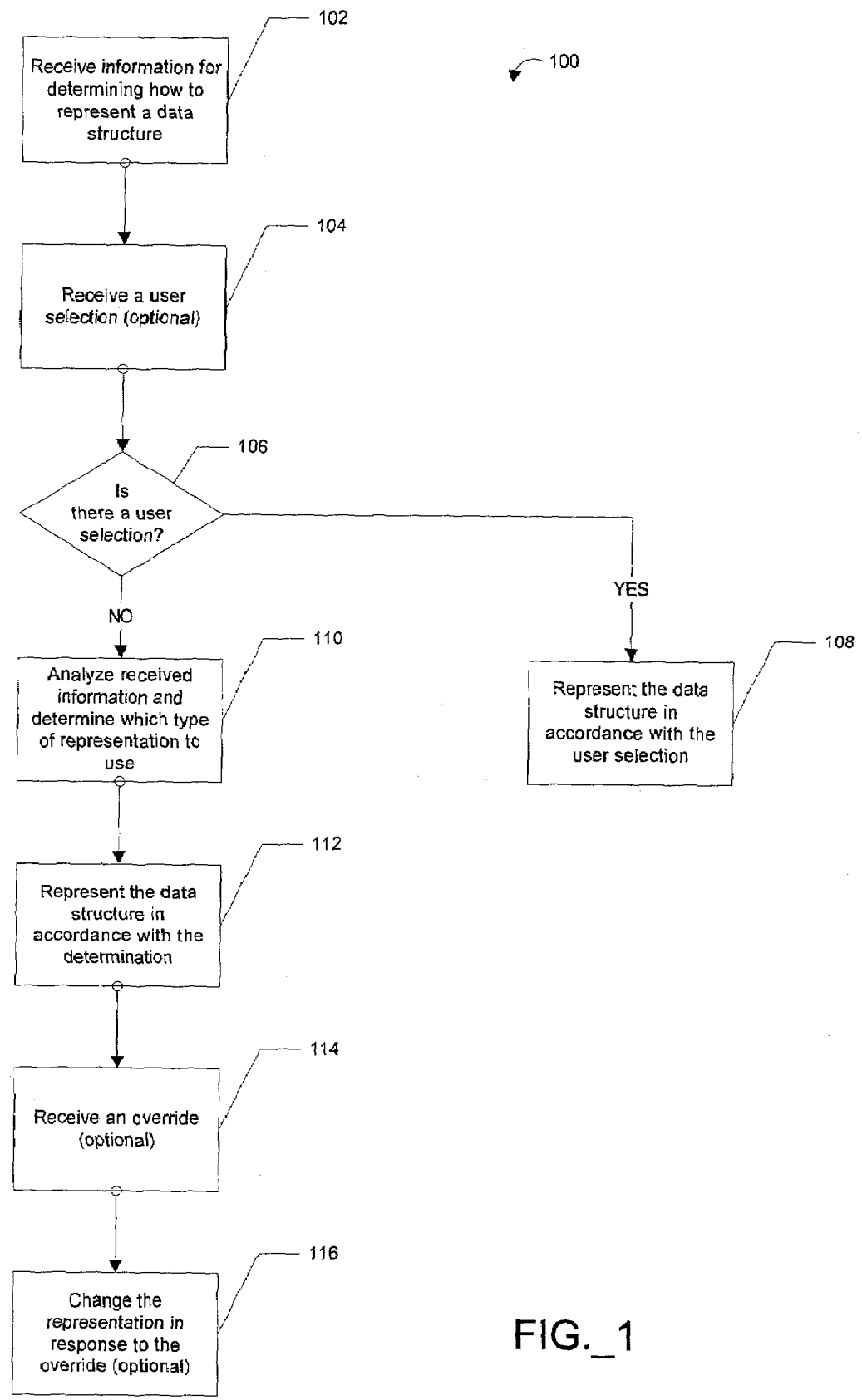
FIG._1

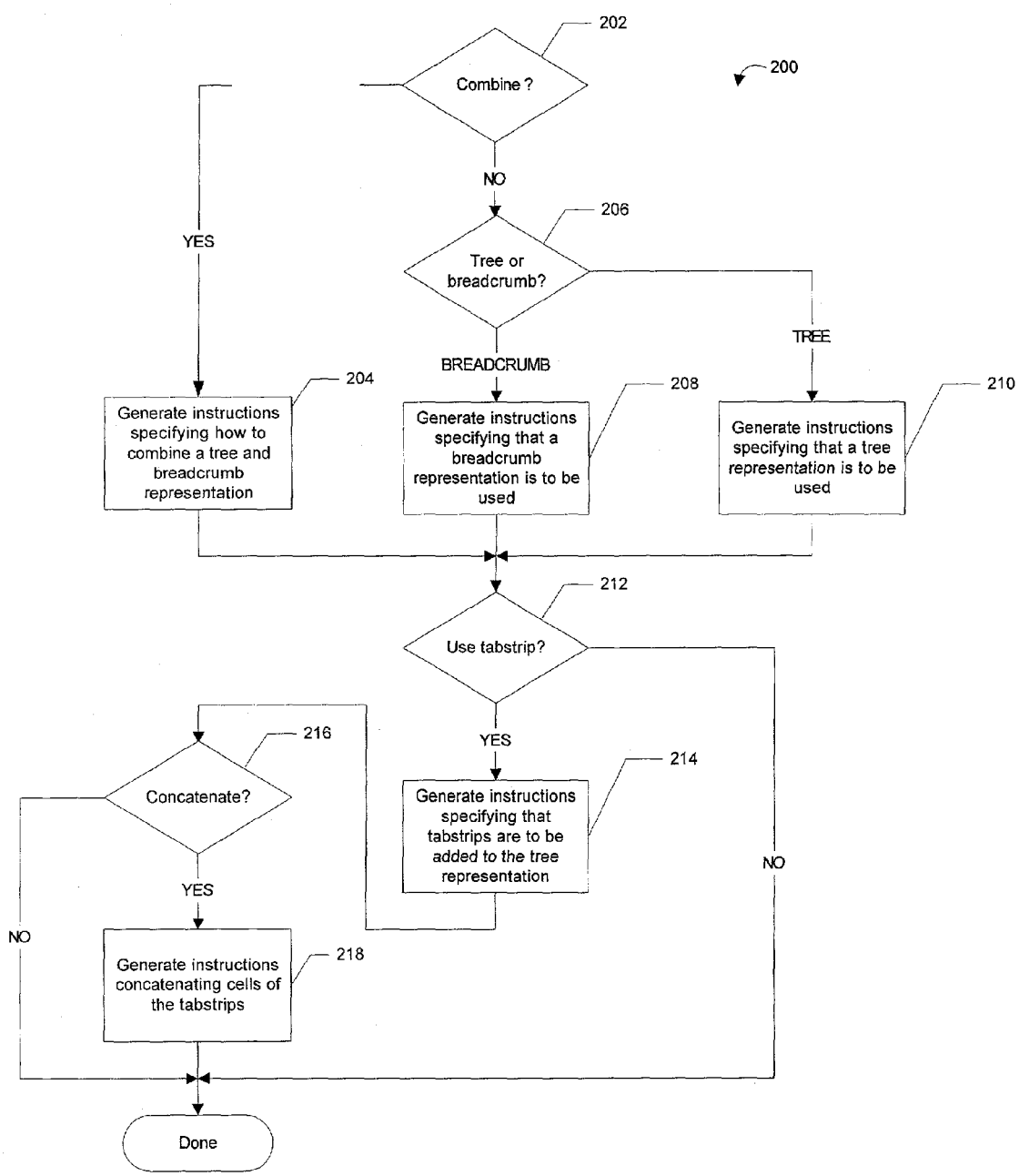
FIG._2

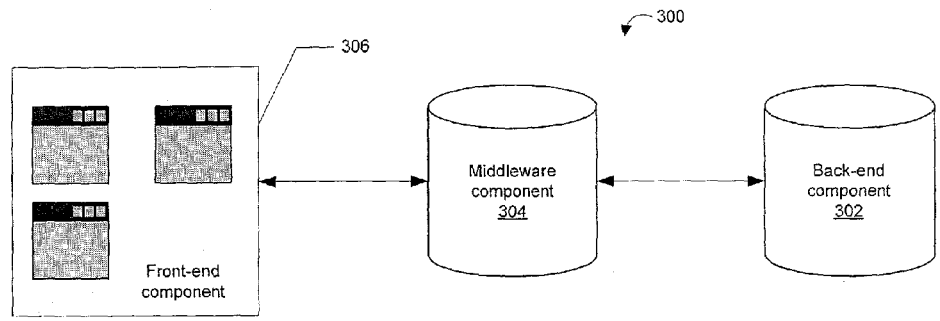
FIG._3
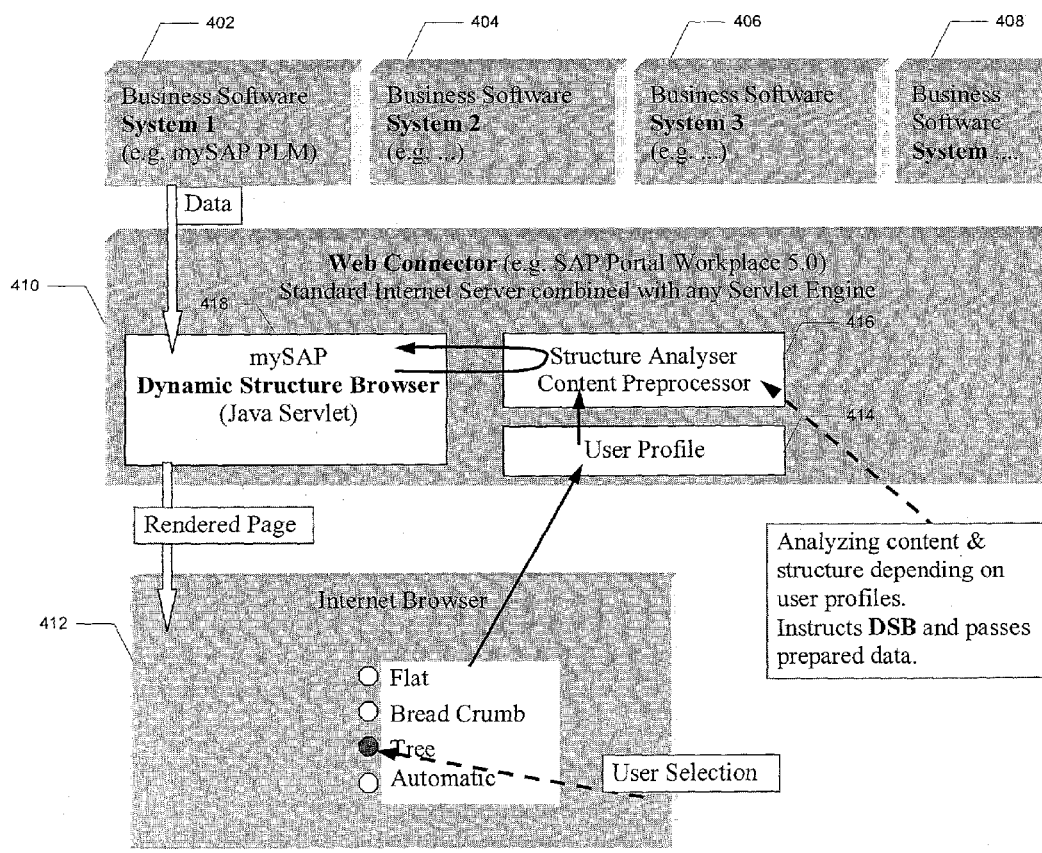
FIG._4

HYBRID AND DYNAMIC REPRESENTATION OF DATA STRUCTURES

This application claims the priority of U.S. Provisional Application Ser. No. 60/361,144, filed Mar. 1, 2002, which is hereby incorporated by reference in its entirety.

BACKGROUND OF THE INVENTION

The present invention relates to representing data structures.

Generally, a data structure articulates the relationships between data objects. Some data structures are represented as hierarchies in which nodes represent data objects and connections between the nodes represent the relationships between the data objects. One type of hierarchy is a tree hierarchy in which there is a root data object from which other data objects branch. Another type of hierarchy is a network hierarchy in which there need not be a root data object. These representations are usually, but need not be, graphical in nature. Whether graphical or not, these representations will be referred to as tree representations. Alternatively, some data structures are represented as paths that connect a first data object to a second data object. These paths describe the figurative route traversed from the first data object to the second data object. Such a path representation will be referred to as a breadcrumb representation.

SUMMARY OF THE INVENTION

The present invention provides methods and apparatus, including computer program products, for hybrid and dynamic representation of data structures.

In general, in one aspect, a computer program product in accordance with the invention includes instructions for causing a processor to represent a data structure as a hybrid of a tree and a breadcrumb representation. The computer program product is tangibly stored on machine-readable media.

In general, in another aspect, a computer program product in accordance with the invention includes instructions for causing a processor to receive information associated with a data structure. The product further includes instructions for using the information received to determine how to represent the data structure. The computer program product is tangibly stored on machine-readable media.

In general, in another aspect, a computer program product in accordance with the invention includes instructions for causing a processor to receive information associated with a data structure. The product further includes instructions for using the information received to determine whether to represent the data structure as one of a tree representation, a breadcrumb representation, and a hybrid of the tree and the breadcrumb representations. The computer program product is tangibly stored on machine-readable media.

In general, in another aspect, a method in accordance with the invention for determining how to represent a data structure includes receiving information for determining how to represent the data structure. The received information includes information that is associated with the data structure, information that is associated with a user, and information that is independent of the user. The method includes receiving rules for determining how to represent the data structure. The method includes selecting a way to represent the data structure. The selection is based on the rules and the received information.

In general, in another aspect, a computer program product in accordance with the invention includes instructions for causing a processor to receive information associated with a data structure and information about a display area. The data structure includes nodes. The product includes instructions for using the information received to represent the data structure as a hybrid of a tree and a breadcrumb representation so all the nodes of the data structure are shown in the display area.

The invention can be implemented to realize one or any combination of the following advantages. A system in accordance with the invention is flexible and represents a data structure in various ways, depending on the characteristics of the data structure. The various ways include but are not limited to using a tree representation, a breadcrumb representation, and any combination thereof. The combination representation will be referred to as a hybrid representation. Furthermore, because of its flexibility, the system supports data structures that have different characteristics. The system allows a user to determine how to represent a data structure before the user launches a request to show the data structure. After the user launches the request, the system can change how the data structure is represented. The system dynamically represents data structures. That is, the system determines how to represent a data structure based on criteria and advantageously represents the data structure in accordance with the determination. The criteria include rules that consider factors such as the amount of data associated with a data structure, the characteristics of the data structure, the computer environment from which the user operates, and the user profile. The system optionally allows the user to override the system's determination of how to represent a data structure. The system can represent complex and large data structures in a dynamic user interface that can be tailored to satisfy user requirements, including showing, in the representation, all information that the user requested even when the interface is being displayed on a display device that has a small display area. The system can dynamically switch between or among different representations of a data structure without having to again retrieve the data structure from a back-end component such as a database. The system buffers the retrieved data in a middleware component and reuses this buffered data to switch between or among different representations. The system allows the user to selectively change branches of a tree representation into corresponding breadcrumb representations and, hence, allows the user to keep track of nodes the visitor has already selected.

The details of one or more embodiments of the invention are set forth in the accompanying drawings and the description below. Other features and advantages of the invention will become apparent from the description and the drawings, and from the claims.

BRIEF DESCRIPTION OF THE DRAWINGS

FIG. 1 shows a method in accordance with the invention for representing a data structure.

FIG. 2 shows a method in accordance with the invention for determining which representation to use.

FIG. 3 shows a system in accordance with the invention for representing a data structure.

FIG. 4 shows an implementation of the system.

Like reference numbers and designations in the various drawings indicate like elements.

DETAILED DESCRIPTION

Figure 5:
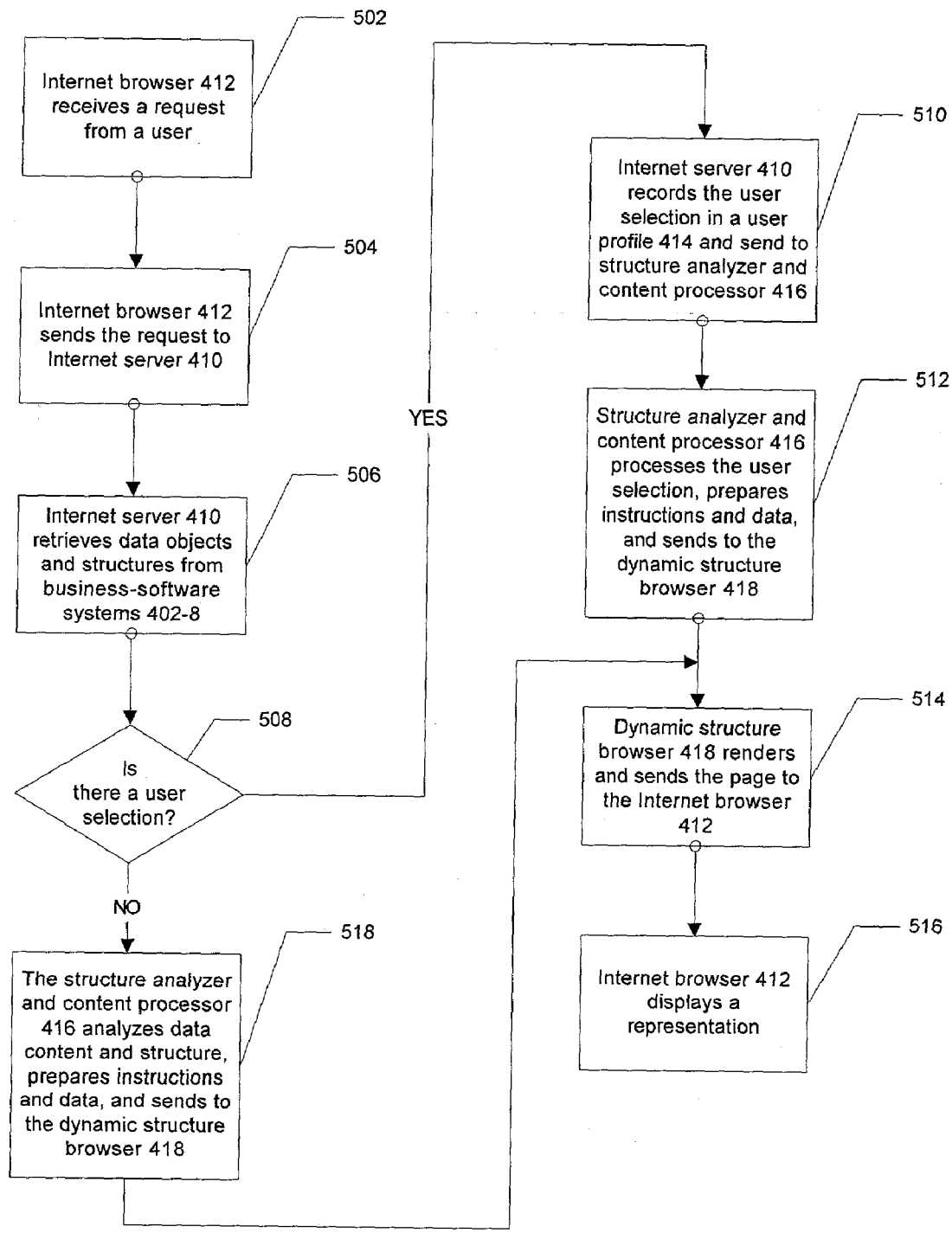
FIG. 5 shows a method in which the implementation represents a data structure in response to a user request.

FIG. 1 shows a method 100 in accordance with the invention for representing a data structure. A system performing the method 100 receives information for determining how to represent the data structure (step 102). The information can include the amount of data associated with a data structure, such as the number of data objects and the field widths and types of data objects. The information can include the characteristics of the data structure, such as the depth of the structure (e.g., the number of levels in the data structure), the dimensions of the data structure, and the symmetries of and patterns within the data structure (e.g., cross references and self references). The system extracts characteristics of the data structure from either the data objects, the data structure, or from both. Alternatively, the characteristics of the data structure can be stored with the data objects and retrieved by the system. The information can include a description of the computing environment in which a user operates, such as the size of the screen of a display device, color limitations of an output device, color limitation of an application, and available fonts. The information can include the profile of the user, such as the user's previous interactions, profession, skills, age, gender, language, and country.

Optionally, the system receives a user selection that specifies which representation is to be used to represent the data structure (step 104). A user selection specifies a particular representation that the user wants to use. When there is such a user selection, the system represents the data structure in accordance with the user selection (decision 106 and step 108).

Otherwise, the system analyzes the received information and determines which type of representation to use to represent the data structure (step 110). The types of representations include a breadcrumb representation, a tree representation, a flat-table representation, and any combination thereof (i.e., the hybrid representation). Examples of the hybrid representation include but are not limited to a tree and flat-table representation, a breadcrumb and flat-table representation, and a breadcrumb and a tree representation that includes tabbed folders in a tab strip, both of which are discussed below.

The system represents the data structure in accordance with the determination (step 112). The system can thus automatically represent the data structure using a particular representation, for example, the hybrid representation, without user input specifying that the particular representation is to be used.

Optionally, the system receives an override specifying a representation of the data structure that is different from the one that the system has used to represent the data structure (step 114). In response, the system changes the representation to comply with the override (step 116).

FIG. 2 shows one method 200 in accordance with the invention for determining which type of representation to use to represent a data structure. The system determines whether to use a hybrid representation, e.g., by combining a tree representation and a breadcrumb representation (decision 202). Table 1 shows an example of pseudo code for determining whether to use a hybrid representation.

TABLE 1

Combine a tree representation with a breadcrumb representation, depending on the following factors and rule.
Factors:
    Available screen size: ssize
    Tree size: tsize
    Accepted overlap: olap
    User setting - suppress scrollbars: noscroll
Rule:
if((tsize + olap) > ssize AND noscroll == 'true'){
    collapse expanded inactive nodes and append BreadCrumbs to these nodes
    }

If the system decides to use the hybrid, then the system generates instructions specifying that a hybrid representation is to be used (step 204).

If the system decides not to use a hybrid representation, then the system determines whether to use a tree or a breadcrumb representation (decision 206). The determination is based on the complexity of the data structure and also on the probability that a user will expand several branches of the data structure down to a certain depth in the hierarchy. Table 2 shows an example of pseudo code for determining whether to use a breadcrumb or a tree representation.

TABLE 2

Select either a tree or breadcrumb representation depending on the following factors and rule.
Factors:

Number of items within current level that are having a substructure: nrOfSubStructs
Limit for nrOfSubStructs defined at customizing section: maxNrOfSub $$\text{Average depth of substructures: avDepth} = \frac{\sum_{i=1}^{\text{nrOfSubStructs}} \text{depthOfstruct}_i}{\text{nrOfSubStructs}}$$

Limit for avDepth: maxAvDepth
User setting - preset tree: treeOn
Rule:

if( (nrOfSubStructs > maxNrOfSub ) OR ( avDepth > maxAvDepth ) OR ( treeOn = 'true' ) ) {
    "generate tree interface"
    }
else "generate BreadCrumb page"

If the system decides to use the breadcrumb representation, then the system generates instructions specifying that a breadcrumb representation is to be used (step 208). Otherwise, the system generates instructions specifying that a tree representation is to be used (step 210). Regardless of whether the system selects a hybrid, breadcrumb, or tree representation, the system determines whether tab strips and tabbed folders are needed (decision 212). Table 3 shows an example of pseudo code to make such a determination.

TABLE 3

Decide if a Tree needs to be combined with a TabStrip depending on the following factors and rule.
Factors:
    Number of structure dimension, which means the number of links to different object types : dim
    Display nested information for a definite object: allData[objType]
    (Yes = show list of attributes as a table within a tabbed folder,
    No = only show a tree node with an icon and the belonging object ID)
Rule:

TABLE 3-continued

```
for (i = 1 to dim) {
    if(allData[objType(i)] == 'Yes') {
        "Make the parent tree node launching a TabStrip showing the
        data of current node
        in a tabbed folder"
        }
    else "Create a tree node only"
    }
```

If the system determines that tab strips and tabbed folders are needed, then the system generates instructions to include tab strips and tabbed folders (step 214). The system determines whether to concatenate cells of the tabbed folders, which are tables (decison 216). Table 4 shows an example pseudo code for making such a determination. If the system decides to concatenate, then the system generates instructions to do so (step 218).

TABLE 4

Decide whether to concatenate data types and field lengths on the representation (e.g., cell width).
Factors:
    Maximum width available to display the data structure: maxWidth
    Number of different object types in a structure: nrOfTypes
    Number of data fields describing an object in a structure:
    nrOfFields[objectType]
    Data type of such a field (primitive types, such as: Integer, String,
    Long, . . . ): fieldType
    Maximum length per field (of all objects of a certain type):
    maxLength[nrOfFields[objectType]]
Rule:
```
for(nrOfTypes) {
    for(nrOfFields[objectType]) {
        if((Σ maxLength[nrOfFields[objectType]] > maxWidth) AND
          (fieldType == 'String')) {
            "cut off each String and append a trailing '. . . ' sequence
            and create tooltips, showing the complete String"
            }
        OR(fieldType == 'Float')) {
            "trim from zeros"
            }
        }
    }
```

Alternatively, any other method can be used to determine how to represent the data structure. Furthermore, other types of representations can be used. Additionally, the system can include different rules such as those that consider different factors. These factors can be those that are associated with a data structure, those that are associated with a user, and those that are independent from a user. Factors associated with the data structure can be the length of a field of data object and the total number of data objects that a user requested.

FIG. 3 shows a system 300 in accordance with the invention. The system includes a back-end component 302, such as a data server, in which the system stores data objects and corresponding data structures. The system includes a middleware component 304, such as an application server or an Internet server. The middleware component includes logic and the described criteria for determining how to represent a data structure. The system includes a front-end component 306, such as a Microsoft® Windows® graphical user interface or an Internet browser.

The middleware component 304 exchanges data, including data objects and data structures, with the back-end component 302. The front-end component 306 exchanges data with the middleware component 304. In response to a user request for information, such as a request to display the data structure of data objects stored in the data server, the middleware component 304 retrieves data from the back-end component 302, determines which type of representation to use, and, when necessary, provides to the front-end component 306 instructions for representing the data structure.

Note that the described criteria are predefined, such as during an initial service customization. Alternatively, the criteria can be defined after the middleware component 304 has retrieved data from the back-end component 302. The criteria can also be defined after the middleware component 304 has retrieved data from the back-end component 302 and after the user receives a response to the user's request. The criteria can also be defined by the system 300 by analyzing, e.g., interactions with the user.

The time after which the middleware component 304 has retrieved data from the back-end component 302 in response to a user request is referred to as the run time. Thus, at run time, the request data is present in the middleware component 304 and need not be retrieved again to be processed by the middleware component 304 (e.g., an Internet server) or front-end component 306 (e.g., an Internet browser on the client side), which processing includes reusing the data in a stateful manner, re-arranging the data according to new parameters, and then representing the re-arranged data.

Stateful refers to the capacity to recall each operation and the corresponding data structure or corresponding data by a computer application. This capacity allows the system to change from one representation to another without having to again retrieve and reprocess the data.

FIG. 4 shows one implementation of the system. In this implementation, the back-end component 302 includes business-software systems 402-8, the middleware component 304 includes a standard Internet server 410, and the front-end component 306 includes an Internet browser 412. The Internet server 410 includes a user profile 414, a structure analyzer and content processor 416, and a dynamic structure browser 418, which can be any servlet engine.

As shown in FIG. 5, the Internet browser 412 receives a request, from a user, to display some particular data objects and the corresponding data structure (step 502). Optionally, the request includes a user selection that specifies which type of representation to use.

The Internet browser 412 sends this request to the Internet server 410 (step 504). The Internet server 410 retrieves the data objects and corresponding data structure from business-software systems 402-8 (step 506). The Internet server 410 determines if there is a user selection (decision 508).

If there is a user selection, the Internet server 410 records the user selection in the user profile 414 and conveys the user selection to the structure analyzer and content processor 416 (step 510). The structure analyzer and content processor 416 processes the user selection, provides instructions and prepares data in accordance with the user selection and for the dynamic structure browser 418, and sends the prepared data and instructions to the dynamic structure browser 418 (step 512).

If there is not a user selection, the structure analyzer and content processor 416 analyzes the data objects and the data structure and other information needed to determine how to represent a data structure, provides instructions, prepares the data, and sends the instructions and prepared data to the dynamic structure browser 418 (step 518). The analysis of the content of the data objects and the data structure is based on described factors such as data structure characteristics and user environment.

As discussed, the information needed to represent a data structure includes information associated with data objects and data structures, information associated with a user, information that is independent of a user (such as parameters set by a system administrator), and information defined by the system itself. Except for the information associated with the data objects and structures (which can be extracted), the system stores the described information in a user profile at middleware component.

Alternatively, the system can store the user profile at any level in the system, including the back-end and front-end components. Furthermore, the system can store the described information separately. Information associated with a user can be stored on any of the three components. Parameters set by a system administrator are usually stored on the middleware component.

The dynamic structure browser 418 uses the instructions and prepared data to render a page that includes a representation of the data objects and corresponding data structure requested by the user and, additionally, sends the rendered page to the Internet browser 412 (step 514). The Internet browser 412 displays a representation of the data objects and data structure to the user (step 516).

The following describes an example scenario where a user, such as an engineer, is visiting a supplier's Internet service to search for a particular product. The supplier's Internet service is provided by a system similar to the one shown in FIG. 4. An initial search provides the user with a listing of products from the supplier's catalogue and also corresponding bills of material ("BOM"). The user can refine the search by selecting certain products on this list.

How the system presents the list to the user depends on factors previously described, such as the number of products in the list (i.e., the number of search hits or data objects requested), the number of columns and rows needed to display a product (i.e., the field length and depth of fields of a data object), the type of data structure of a BOM (i.e., breadcrumb, building-block, or tree structure), the depth of the data structure of a BOM, and whether there are multiple occurrences of the same assemblies within different products.

Note that the data structure of a BOM can have more than two dimensions. Apart from a node's parent-to-child relation to another node, each node in a tree can also point to nodes of different data structures. These nodes of different data structures can represent product materials or groups or classes of meta data.

As discussed, the system represent the data structure of a BOM in various ways, depending on criteria. One representation includes a table with columns and rows that are self-concatenating, i.e., cells containing a large data fields are automatically shortened. For example, if a certain pre-defined amount of data is exceeded (i.e., too many images or too many result hits), re-routing links that point to the data are created.

Figure 6:
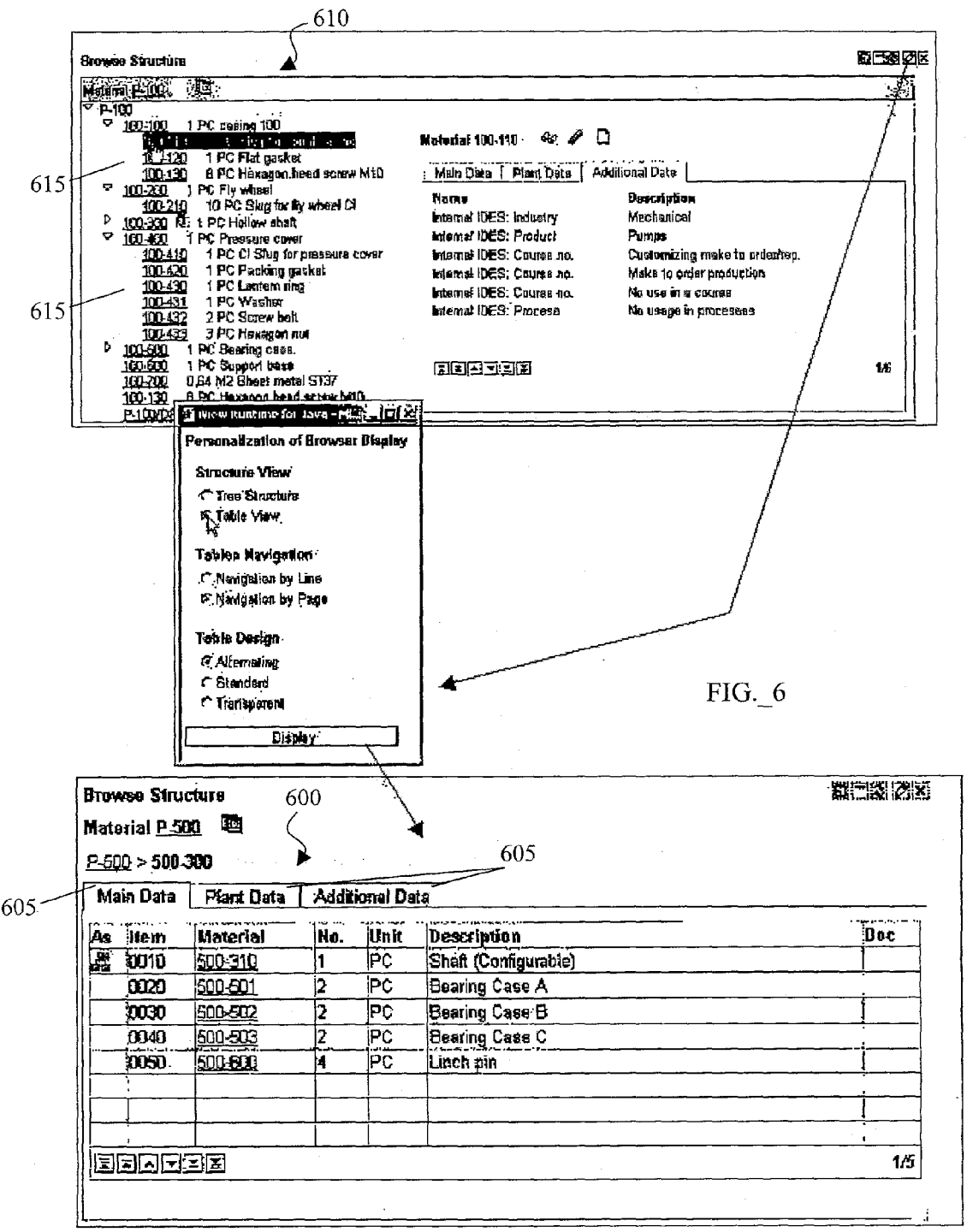
FIG. 6 shows examples of representations in accordance with the invention.

One representation includes breadcrumbs. A breadcrumb usually is combined with a table that shows the materials of a product (i.e., the children of a node that represents a product). Another representation includes a tree. In this scenario, the system displays hierarchies from top to bottom and left to right, with a parent node on top and to the left of a corresponding child node. A breadcrumb is always one branch and a tree shows two or more parallel branches in a two-dimensional data structure. One representation includes pointers from a two-dimensional node to additional (and independent) dimensions by using tabbed folders in a tab strip. FIG. 6 shows an example of a tab strip 600 having three tabbed folders 605.

One representation includes any combination of the above, including the following combinations: tree and table; breadcrumb and table; breadcrumb, tables and tabbed folders. FIG. 6 also shows an example of a representation of the list of products 610 and the corresponding BOMs 615.

The system selects the representation, including a hybrid representation, that satisfies the needs of the user. The selection is knowledge-based. The selected representation includes dynamic Web content. In this scenario, the system dynamically creates and adapts a representation of the BOM in the Web interface. The system analyzes the information about the data structure such as the amount of data associated with and complexity of the data structure. The system can adapt the representation at run time. The adaptation can be launched either by a user, the page (client side), or the Web program (Web application layer) itself. Table 5 shows some example representations the system can use and the adaptation the system can perform.

TABLE 5

| Presentation Form 1 | Transform | Presentation Form 2 |
|---|---|---|
| Bread Crumb plus Table | ⇆ | Tree |
| Bread Crumb plus Table | ⇆ | Tree plus Table |
| BreadCrumb plus Tabbed Folder (each folder may contain a table) | ⇆ | Tree plus Tabbed Folder (each folder may contain a table) |
| Tree | → | Tree plus Bread Crumb |

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs ("application-specific integrated circuits").

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations. Other implementations are within the scope of the invention. For example, the steps of the invention can be performed in a different order and still achieve desirable results. The back-end component can be any data storage system such as a database, a file system, or a LDAP directory. The middleware component can be any system that is able to interact with the data stored in the back-end component, including a database management system, an Internet application, and an application server. The front-end can be any user interface, including a browser and a Windows graphical user interface. Although the described methods and apparatus have been described with respect to data structures of data objects, these methods and apparatus are applicable to any type of data structures. The described system is not limited to only the method shown in FIG. 2. Rather, the system can use any rule-based method that determines how to represent a data structure.

What is claimed is:

1. A computer-implemented method for representing a data structure, comprising:
   representing the data structure as a first representation of data objects;
   buffering data from the data structure in a middleware component;
   reusing the buffered data to represent the data structure as a hybrid representation;
   receiving user input specifying a portion of the first representation;
   representing the data structure as the hybrid representation to display the portion specified by the user input, the hybrid representation comprising second and third representations of the data objects, wherein the first, second and third representations are different and are each selected from a group consisting of a tree, a breadcrumb, a table, and a tabbed folder, wherein representing the data structure as a hybrid representation comprises:
      designating one of the second and third representations to be a tree or breadcrumb based on a complexity of data structure and based on a probability that several branches of the data structure are expanded to a predefined level of a hierarchy, the hierarchy having nodes representing the data objects stored in the data structure and connections among the nodes, the connections representing relationships between the data objects,
   wherein the second and third representations of data structures are selected according to data within a user profile; and
   displaying the portion of the first representation specified by the user input.

2. The method of claim 1, wherein selecting the second, third representations of data structures comprises: comparing characteristics of the data structure with characteristics of a computing environment.

3. The method of claim 2, wherein the characteristics of the data structure comprise:
   one or more of an amount of data associated with the data structure, a number of levels in the data structure, a dimension of the structure, a symmetry of the data structure, and a pattern of the data structure.

4. The method of claim 2, wherein the characteristics of the computing environment comprise:
   one or more of a display, an available font, and a color limitation of the display.

5. The method of claim 1, further comprising:
   receiving input specifying a data structure representation other than the hybrid representation; and
   representing the data structure as the data structure representation specified by the input.

6. The method of claim 1, further comprising:
   receiving input specifying a portion of the data structure; and
   changing the portion from a tree portion into a breadcrumb portion.

7. The method of claim 1, further comprising:
   rearranging the hybrid representation of the data structure into a further data structure representation.

8. The method of claim 7, wherein rearranging the hybrid representation comprises:
   reusing information related to the previous representation of the data structure.

9. The method of claim 1, wherein:
   representing the data structure as the hybrid representation occurs automatically without a user request.

10. The method of claim 1, wherein representing the data structure as a hybrid representation comprises designated each of the first, second, and third representations as one of a tree, a bread crumb, a table, and a tabbed folder.

11. The method of claim 10, wherein representing the data structure as a first representation comprises representing the data structure as a second hybrid representation, wherein the first representation comprises fourth and fifth representations that are different.

12. The method of claim 11, wherein representing the data structure as a second hybrid representation futher comprises designating each of the fourth and fifth representations as one of a tree, a bread crumb, a table, and a tabbed folder.

13. The method of claim 12, wherein:
   representing the data structure as a second hybrid representation further comprises designating fourth and fifth representations as a table amd a bread crumb; and
   represention the data structure as a first representation further comprises designating the second and third representations as a table and a tree.

14. The method of claim 1, wherein representing the data structure as a hybrid representation comprises:
   designating the first representation as a tree;
   designating the second representation as a table; and
   designating the third representation as a bread crumb.

15. A computer program product, stored on a machine readable storage device, for representing a data structure, the product comprising instructions to cause a processor to:
   receive information associated with the data structure;
   represent the data structure as a first representation of data objects;
   buffer data from the data structure in a middleware component;
   reuse the buffered data to represent the data structure as a hybrid representation;
   representing the data structure as the hybrid representation to display the portion specified by the user input, the hybrid representation comprising second and third representations of the data objects, wherein the first, second and third representations are different and are each selected from a group consisting of a tree, a breadcrumb, a table, and a tabbed folder, wherein the instructions to cause the processor to represent the data structure as the hybrid representation comprises further instructions that cause to the processor to:
designate one of the second and third representations to be a tree or breadcrumb based on a complexity of data structure and based on a probability that several branches of the data structure are expanded to a predefined level of a hierarchy, the hierarchy having nodes representing the data objects stored in the data structure and connections among the nodes, the connections representing relationships between the data objects,
wherein the second and third representations of data structures are selected according to data within a user profile; and
display the portion of the first representation specified by the user input.

16. The product of claim 15, wherein the received information comprises:
one or more of data structure information, user information, and user-independent information.

17. The product of claim 15, wherein the received information comprises:
a rule used to determine how to represent the data structure.

18. The product of claim 15, wherein the product comprises instructions to cause the processor to:
receive information assciated with characteristics of a computing environment.

19. The product of claim 18, wherein the information associated with characteristics of the computing environment comprises:
one or more of a size of a display, an available font, and a color limitation of the display.

20. The product of claim 13, wherein:
the data structure comprises a collection of nodes; and
the hybrid representation of the data structure allows the collection of nodes to be shown in a display area.

21. The product of claim 15, wherein the instructions also cause the processor to:
receive a request to represent the data structure, the processor determining how to represent the data structure before receiving the request.

22. The product of claim 15, wherein the instructions also cause the processor to:
receive input specifying, a portion of the data structure; and
determine how to represent the data structure as a second hybrid representation to display the portion specified.

23. The method of claim 15, wherein ach of the first, second, and third representations is one of a tree, a breadcrumb, a table, and a tabbed folder.

24. A system for representing a data structure comprising:
a processor;
a machine-readable component storing criteria used to determine how to represent the data structure as a first data structure representation of data objects; and
a rearrangement logic to
represent the data structure as a first representation of data objects;
buffer data from the data structure in a middleware component;
reuse the buffered data to represent the data structure as a hybrid representation;
receive user input specifying a portion of the first representation;
represent the data structure as the hybrid representation to display the portion specified by the user input, the hybrid representation comprising second and third representations of the data objects, wherein the first, second and third representations are different and are each selected from a group consisting of a tree, a breadcrumb, a table, and a tabbed folder, wherein representing the data structure as a hybrid representation comprises:
designate one of the second and third representations to be a tree or breadcrumb based on a complexity of data structure and based on a probability that several branches of the data structure are expanded to a predefined level of a hierarchy, the hierarchy having nodes representing the data objects stored in the data structure and connections among the nodes, the connections representing relationships between the data objects,
wherein the second and third representations of data structures are selected according to data within a user profile; and
display the portion of the first representation specified by the user input.

25. The system of claim 24, wherein the criteria comprises: characteristics of the data structure.

26. The system of claim 25, wherein the component further comprises:
extraction logic used to extract the characteristics of the data structure from the data structure.

27. The system of claim 24, wherein the criteria comprises:
one or more of a user preference and a user profile.

28. The system of claim 24, wherein the component includes:
an input device to receive a user request to selectively rearrange the data structure.

29. The system of claim 24, wherein:
the rearrangement logic is further configured to designate each of the first, and second, and third categories of data structures as one of a tree, a bread crumb, a table, and a tabbed folder.

30. The system of claim 24, wherein the system further comprises:
a back-end database used to store the data structure.

31. The system of claim 24, wherein the system further comprises:
a front-end component used to display the data structure representation to a user.

32. The system of claim 24, wherein:
the component is middle ware component.

* * * * *

UNITED STATES PATENT AND TRADEMARK OFFICE
CERTIFICATE OF CORRECTION

PATENT NO. : 7,328,215 B2
APPLICATION NO. : 10/137211
DATED : February 5, 2008
INVENTOR(S) : Stumpf It is certified that error appears in the above-identified patent and that said Letters Patent is hereby corrected as shown below:

On the title page, item (56), under "U.S. Patent Documents", in column 1, line 1, delete "345/763" and insert -- 715/763 --, therefor.

In column 5, line 15, delete "decison" and insert -- decision --, therefor.

In column 5, line 38 (Table 4), delete "))" and insert -- ) --, therefor.

In column 8, line 24 (Table 5), delete "Bread Crumb" and insert -- BreadCrumb --, therefor.

In column 8, line 25 (Table 5), delete "Bread Crumb" and insert -- BreadCrumb --, therefor.

In column 8, line 29 (Table 5), delete "Bread Crumb" and insert -- BreadCrumb --, therefor.

In column 9, line 52, in Claim 1, before "data" insert -- the --.

In column 9, line 64, in Claim 2, after "second" delete "," and insert -- and --, therefor.

In column 10, line 5, in Claim 3, after "the" insert -- data --.

In column 10, line 9, in Claim 4, before "display" insert -- size of a --.

In column 10, line 26, in Claim 8, delete "the" and insert -- a --, therefor.

In column 10, line 32, in Claim 10, delete "designated" and insert -- designating --, therefor.

In column 10, line 34, in Claim 10, delete "bread crumb,a" and insert -- breadcrumb, a --, therefor.

In column 10, line 41, in Claim 12, delete "futher" and insert -- further --, therefor.

In column 10, line 43, in Claim 12, delete "bread crumb," and insert -- breadcrumb, --, therefor.

In column 10, line 47, in Claim 13, delete "amd" and insert -- and --, therefor.

UNITED STATES PATENT AND TRADEMARK OFFICE
CERTIFICATE OF CORRECTION

PATENT NO.         : 7,328,215 B2
APPLICATION NO.    : 10/137211
DATED              : February 5, 2008
INVENTOR(S)        : Stumpf It is certified that error appears in the above-identified patent and that said Letters Patent is hereby corrected as shown below:

In column 10, line 47, in Claim 13, delete "bread crumb;" and insert -- breadcrumb; --, therefor.

In column 10, line 48, in Claim 13, delete "represention" and insert -- representing --, therefor.

In column 10, line 48, in Claim 13, after "first" insert -- hybrid --.

In column 10, line 55, in Claim 10, delete "bread crumb." and insert -- breadcrumb. --, therefor.

In column 10, lines 56-57, in Claim 15, after "a" delete "machine readable".

In column 10, line 65, in Claim 15, after "representation;"
insert -- receive user input specifying a portion of the first representation; --.

In column 10, line 66, in Claim 15, delete "representing" and insert -- represent --, therefor.

In column 11, line 10, in Claim 15, before "breadcrumb" insert -- a --.

In column 11, line 11, in Claim 15, before "data" insert -- the --.

In column 11, line 33, in Claim 18, delete "assciated" and insert -- associated --, therefor.

In column 11, line 51, in Claim 22, after "specifying" delete ",".

In column 11, line 55, in Claim 23, delete "ach" and insert -- each --, therefor.

In column 12, line 20, in Claim 24, before "breadcrumb" insert -- a --.

In column 12, line 21, in Claim 24, before "data" insert -- the --.

In column 12, line 49, in Claim 29, before "second," delete "and".

UNITED STATES PATENT AND TRADEMARK OFFICE
CERTIFICATE OF CORRECTION

PATENT NO. : 7,328,215 B2
APPLICATION NO. : 10/137211
DATED : February 5, 2008
INVENTOR(S) : Stumpf It is certified that error appears in the above-identified patent and that said Letters Patent is hereby corrected as shown below:

In column 12, line 50, in Claim 29, delete "bread crumb" and insert -- breadcrumb --, therefor.

In column 12, line 60, in Claim 32, delete "middle ware" and insert -- a middleware --, therefor.

Signed and Sealed this

Twenty-second Day of December, 2009

David J. Kappos
*Director of the United States Patent and Trademark Office*